US012627874B2

(12) United States Patent
Chisu

(10) Patent No.: US 12,627,874 B2
(45) Date of Patent: May 12, 2026

(54) ELECTRONIC DEVICES AND CORRESPONDING METHODS FOR TRANSFERRING ELECTRONIC COMMUNICATIONS OPERATIONS BETWEEN WIRELESS COMMUNICATION SUBSYSTEMS FOR DARK SHOT NOISE REDUCTION

(71) Applicant: Motorola Mobility LLC, Chicago, IL (US)

(72) Inventor: Daniel C Chisu, Franklin Park, IL (US)

(73) Assignee: Motorola Mobility LLC, Chicago, IL (US)

( * ) Notice: Subject to any disclaimer, the term of this patent is extended or adjusted under 35 U.S.C. 154(b) by 92 days.

(21) Appl. No.: 18/661,156

(22) Filed: May 10, 2024

(65) Prior Publication Data

US 2025/0350822 A1 Nov. 13, 2025

(51) Int. Cl.
 *H04N 23/52* (2023.01)
 *H04N 23/71* (2023.01)
 *H04N 23/76* (2023.01)

(52) U.S. Cl.
 CPC ............. *H04N 23/52* (2023.01); *H04N 23/71* (2023.01); *H04N 23/76* (2023.01)

(58) Field of Classification Search
 CPC ......... H04N 23/52; H04N 23/71; H04N 23/76
 See application file for complete search history.

(56) References Cited

U.S. PATENT DOCUMENTS

| | | | | |
|---|---|---|---|---|
| 8,089,552 B2 * | 1/2012 | Suzuki | ................. | H04N 23/634 |
| | | | | 348/333.01 |
| 10,992,368 B1 | 4/2021 | Chisu et al. | | |
| 11,258,504 B2 | 2/2022 | Chisu et al. | | |
| 11,909,124 B2 * | 2/2024 | Eder | .................... | H04B 7/0608 |
| 12,317,242 B2 * | 5/2025 | Chisu | .................... | H04W 76/15 |
| 2010/0237149 A1 * | 9/2010 | Olmstead | ........... | G06K 7/10722 |
| | | | | 235/470 |
| 2014/0211041 A1 * | 7/2014 | Mccrackin | ............. | H04N 23/73 |
| | | | | 348/223.1 |
| 2019/0324156 A1 * | 10/2019 | Miura | ................... | A61B 6/4233 |
| 2021/0281312 A1 * | 9/2021 | Chisu | .................... | H04B 7/088 |
| 2022/0030186 A1 * | 1/2022 | Ogawa | .................. | H04N 25/63 |
| 2022/0166932 A1 * | 5/2022 | Agrawal | ............... | H04N 23/90 |
| 2023/0118841 A1 * | 4/2023 | Chisu | ................. | H04W 64/003 |
| | | | | 370/329 |
| 2023/0268665 A1 | 8/2023 | Lee et al. | | |
| 2023/0341568 A1 * | 10/2023 | Wada | .................... | G01N 23/04 |

(Continued)

*Primary Examiner* — Padma Haliyur
(74) *Attorney, Agent, or Firm* — Philip H. Burrus, IV

(57) ABSTRACT

A method in an electronic device manages thermal energy events affecting the performance of an image capture device. The method includes detecting an elevated thermal energy event at the image capture device, determining if a second wireless communication subsystem is situated farther from the image capture device than a first wireless communication subsystem, and checking if the second wireless communication subsystem is inactive and has a lower temperature than the first wireless communication subsystem. If these conditions are met, the method transfers electronic communication operations from the first wireless communication subsystem to the second wireless communication subsystem. Additionally, the method can perform thermal mitigation operations as well.

20 Claims, 6 Drawing Sheets

(56) References Cited

U.S. PATENT DOCUMENTS

| | | | |
|---|---|---|---|
| 2023/0386193 A1 | 11/2023 | Lee et al. | |
| 2023/0418553 A1 | 12/2023 | Kim et al. | |
| 2024/0187715 A1* | 6/2024 | Dorado | ..................... G06T 5/70 |

* cited by examiner

-- PRIOR ART --

ELECTRONIC DEVICES AND CORRESPONDING METHODS FOR TRANSFERRING ELECTRONIC COMMUNICATIONS OPERATIONS BETWEEN WIRELESS COMMUNICATION SUBSYSTEMS FOR DARK SHOT NOISE REDUCTION

BACKGROUND

Technical Field

The present disclosure relates to wireless communication systems, particularly the thermal management of camera modules in devices with millimeter-wave (mm Wave) technology.

Background Art

Contemporary portable communication devices incorporate a variety of sophisticated components that enable a multitude of functionalities. One challenge that arises from the integration of these components is the management of thermal energy within the device. Excessive thermal energy can affect the performance of certain components. As devices become more compact, the proximity of heat-generating components to these heat-sensitive components becomes a concern. It would be advantageous to have an improved electronic device and corresponding methods that mitigates the thermal effects on these components.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
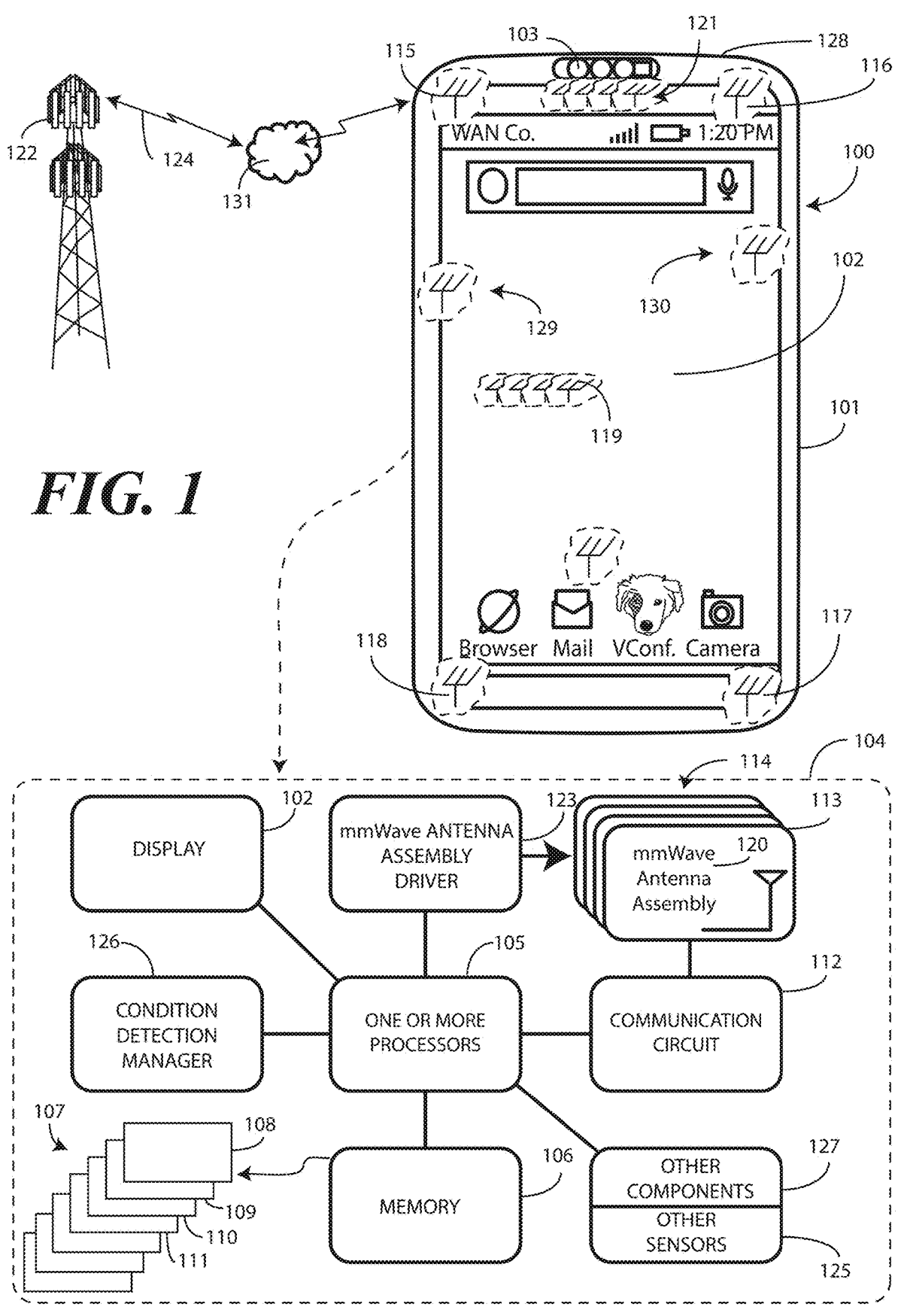
FIG. 1 illustrates on explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting, by one or more processors of an electronic device an elevated thermal energy event occurring at an image capture device that compromises performance of image capture operations of the image capture device and transferring electronic communications operations being performed by a first wireless communication subsystem to a second wireless communication subsystem having a lower temperature to mitigate dark shot noise in an image capture device. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with image capture operations.

It will be appreciated that embodiments of the disclosure described herein may be comprised of one or more conventional processors and unique stored program instructions that control the one or more processors to implement, in conjunction with certain non-processor circuits, some, most, or all of the functions of detecting a temperature of at least one image capture device exceeding a predefined threshold and transferring at least some electronic communication operations of the electronic device being performed by a first wireless communication subsystem to a second wireless communication subsystem as described herein. The non-processor circuits may include, but are not limited to, a radio receiver, a radio transmitter, signal drivers, clock circuits, power source circuits, and user input devices. As such, these functions may be interpreted as steps of a method to reduce, by one or more processors, an operating temperature of a first wireless communication subsystem situated closer to an image capture device by transferring at least some electronic communication operations to a second wireless communication subsystem situated farther from the image capture device to improve dark shot noise performance of the image capture device while the image capture device is capturing one or more images.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent.

The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, in today's world portable communication devices have become an integral part of our lives, offering a wide range of functionalities. However, as also noted above, the integration of various sophisticated components in these devices poses a challenge in terms of managing thermal energy. Excessive heat can have a detrimental effect on the performance of certain components, particularly those involved in capturing visual data. This problem becomes especially acute in environments with low ambient light, where the quality of visual data can be compromised.

Adding to the complexity, the emergence of advanced communication technologies operating at higher frequencies, such as millimeter-wave (mm Wave) technology, has introduced additional thermal considerations. These technologies generate significant heat, which can impact nearby components and potentially lead to a degradation in performance. As devices continue to shrink in size, the proximity of these heat-generating components to sensitive visual data capturing components becomes a major concern.

One specific challenge that arises is the impact of dark shot noise on the sensors of image capture devices serving as cameras for an electronic device. Dark shot noise, one of the sources of image noise, is caused by dark shot current—a thermal phenomenon that results in the generation of electrons within the silicon chip even when no photons are incident on the camera. This dark shot current becomes particularly problematic in low-light conditions when the number of thermally generated dark electrons is comparable to the number of photoelectrons. Cooling the image sensor can help reduce dark current, but this becomes challenging in small mobile devices like smartphones, where space for effective sensor cooling is limited and needs to be shared with other heat-generating components.

Moreover, smartphones and other mobile devices often incorporate mm Wave RF and antenna modules, which are known to generate a significant amount of heat, especially at high frequencies and power levels. The heat generated by these mm Wave modules can transfer to the camera module, further exacerbating the issue of dark shot noise. This is a critical concern as the red and blue channels of the camera sensor are particularly susceptible to chroma (color) noise.

Figure 6:
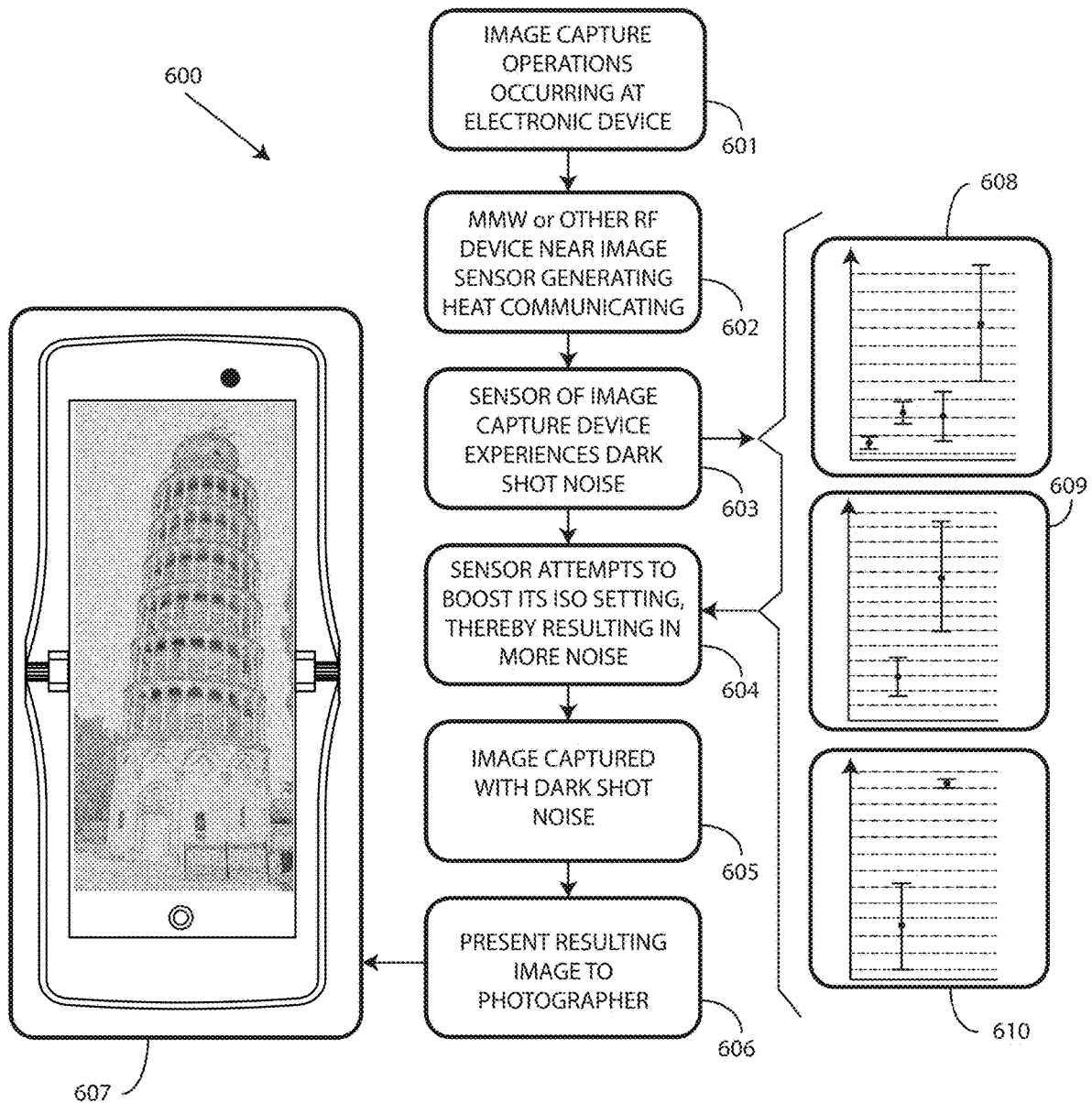
FIG. 6 illustrates a prior art method.

To illustrate this problem, turn now to FIG. 6, where a prior art method 600 is shown. Beginning at step 601, image capture operations are occurring. At step 602, a mmWave or other radio frequency device is operating near the image capture device performing the image capture operations at step 601. In one or more embodiments, this mm Wave or other radio frequency device causes the image capture device to get hot.

When the temperature gets high enough, the dark shot noise problem arises at step 603. The three graphs 608,609, 610 illustrate some effects testing has demonstrated when dark shot noise is occurring. Graph 608 plots the green channel standard deviation (which is the two lines on the left side of the graph) of a standard image capture device compared with the same green channel standard deviation when that image capture device is hot (which are the two lines on the right side of the graph). Graph 609 plots the red channel standard deviation (left line) of the standard image capture device against the red channel standard deviation (right line) when the image capture device is hot. Graph 610 plots the blue channel standard deviation (left line) of the standard image capture device against the blue channel standard deviation (right line) when the image capture device is hot.

When these graphs 608,609,610 are compared it can be seen that dark shot noise injects more noise into the image capture operation. Experimental results show the noise increased by 2.5 dB in one green channel, 3.5 dB in the red channel, and 4.3 dB in the blue channel.

In response to the dark noise, which increases the noise floor as shown in graphs 608,609,610, the image capture device will attempt to boost its ISO setting at step 604. However, this just adds more noise to the image capture operations. When the images are captured at step 605, and presented to the photographer at step 606, as shown at step 607 the resulting images are noisy, grainy, and generally of less than desirable quality.

To address these challenges, there is a need for innovative solutions that minimize the impact of heat generated by mm Wave modules on the camera module of smartphones and other portable devices. By reducing heat transfer to the camera module, it is possible to improve the overall performance and quality of visual data captured by these devices. Embodiments of the disclosure aim to provide a solution that effectively manages the thermal effects of mm Wave modules on camera modules, ensuring optimal performance even in challenging thermal conditions.

Advantageously, embodiments of the disclosure provide solutions to these problems. To wit, embodiments of the disclosure provide a solution to mitigate the impact of heat generated by mm Wave modules on the image capture device serving as the device camera module of smartphones and other portable devices. Embodiments of the disclosure work to minimize heat transfer and improve the overall performance and quality of visual data captured by these devices.

In one embodiment, if a user launches the camera app at high ISO (sensitivity/high sensor gain), where camera noise is most visible, and the temperature of the camera module exceeds a certain threshold while a nearby mm Wave module is operating, and its temperature exceeds another threshold, the system checks if a secondary mm Wave module, located farther away from the camera, can be used based on signal quality and thermal criteria. If so, the system switches the mm Wave modules, allowing the area occupied by the first module near the camera to cool down.

If a second mm Wave module is not available, the system applies a thermal mitigation scheme to the first module by reducing the number of antenna patches to lower its temperature. If patch reduction does not sufficiently cool down the first module, the system disables it, causing mm Wave to be disabled and the device to use sub-6 GHz (known as 5F "FRI frequency bands") or 4G long term evolution ("LTE") bands instead. Alternatively, the system can operate in aggregation mode, where the first module runs in reduced patch element mode together with the second module operating in full mode.

In the event that the temperature of the camera module still exceeds the threshold, the system releases the radio resource control ("RRC") connection at the modem level, either directly or indirectly, and ends the process. The system also includes mechanisms to undo the above actions when the temperature of the camera module is restored to an acceptable level.

Embodiments of the disclosure therefore provide a novel approach to address the thermal challenges associated with mm Wave modules and camera modules in portable devices. By intelligently managing the use of mm Wave modules and implementing thermal mitigation strategies, the invention effectively reduces the impact of heat on camera performance, resulting in improved image quality and reduced dark shot noise. This innovation enhances the overall user experience and ensures optimal functionality of portable communication devices in various thermal conditions.

In one or more embodiments, a method is provided for an electronic device for improving the dark shot noise performance of a hot camera sensor by lowering the temperature of nearby mm Wave modules that are in use and would otherwise cause heat transfer to the camera sensor. In one or more embodiments, the method comprises detecting an elevated thermal energy event occurring at an image capture device that compromises the performance of image capture operations. The method further includes determining whether a second wireless communication subsystem is situated farther from the image capture device than a first wireless communication subsystem and is in an inactive state when the elevated thermal energy event is detected.

If the second wireless communication subsystem meets these criteria, the method transfers electronic communication operations being performed by the first wireless communication subsystem to the second wireless communication subsystem. By doing so, the heat generated by the first wireless communication subsystem, which is situated closer to the image capture device, is reduced, thereby mitigating dark shot noise in the image capture device. On the other hand, if the second wireless communication subsystem is not available or does not meet the criteria, the method may disable all electronic communication operations of all wireless communication subsystems of the electronic device, ensuring that the heat generated by the first wireless communication subsystem does not affect the image capture device.

This method provides an effective solution to address the thermal challenges associated with mmWave modules and camera modules in electronic devices. By intelligently transferring electronic communication operations to a cooler wireless communication subsystem, the invention minimizes the impact of heat on the camera sensor, resulting in improved dark shot noise performance and enhanced image quality.

In one or more embodiments, an electronic device comprises at least one image capture device, a first wireless communication subsystem, and at least a second wireless communication subsystem. The first wireless communication subsystem is situated closer to the image capture device than the second wireless communication subsystem. The electronic device also includes one or more processors operable with the image capture device and the wireless communication subsystems.

When the one or more processors detect a temperature of the image capture device exceeding a predefined threshold, they transfer at least some electronic communication operations of the electronic device being performed by the first wireless communication subsystem to the second wireless communication subsystem. By doing so, the operating temperature of the first wireless communication subsystem, which is in close proximity to the image capture device, is reduced. This transfer of electronic communication operations helps to improve the dark shot noise performance of the image capture device while it is capturing one or more images.

In one or more embodiments, the electronic device provides an effective solution to manage the thermal effects on the image capture device in electronic devices. By transferring electronic communication operations to a wireless communication subsystem situated farther from the image capture device, embodiments of the disclosure mitigate the impact of heat on the image capture device, resulting in improved dark shot noise performance and enhanced image quality.

In one or more embodiments, a method in an electronic device is provided for reducing the operating temperature of a first wireless communication subsystem situated closer to an image capture device. The method involves transferring at least some electronic communication operations from the first wireless communication subsystem to a second wireless communication subsystem situated farther from the image capture device. This transfer of electronic communication operations aims to improve the dark shot noise performance of the image capture device while it is capturing one or more images.

By reducing the operating temperature of the first wireless communication subsystem, embodiments of the disclosure effectively mitigate the impact of heat on the image capture device. This, in turn, leads to improved dark shot noise performance and enhanced image quality. The method allows for the optimization of the electronic device's functionality, ensuring optimal performance even in challenging thermal conditions.

This embodiment of the disclosure provides a practical solution to address the thermal challenges associated with mmWave modules and camera modules in electronic devices. By intelligently transferring electronic communication operations to a cooler wireless communication subsystem, the invention effectively reduces the heat generated by the first wireless communication subsystem, resulting in improved dark shot noise performance and enhanced image quality.

Advantageously, embodiments of the disclosure provide specific methods and systems for detecting elevated thermal energy events at an image capture device and transferring electronic communication operations between wireless communication subsystems to mitigate dark shot noise. Advantageously, embodiments of the disclosure provide intelligent management of heat generated by mmWave modules when those mm Wave modules are in close proximity to camera modules. By monitoring the temperature of the camera module and the mmWave module, embodiments of the disclosure can determine when heat transfer may compromise the performance of the camera sensor.

Advantageously, embodiments of the disclosure then take appropriate actions, such as switching to a secondary mm Wave module located farther from the camera or applying thermal mitigation schemes to reduce the temperature of the first mm Wave module. These novel features enable embodiments of the disclosure to effectively address the thermal challenges associated with mmWave modules and camera modules in electronic devices, resulting in improved dark shot noise performance and enhanced image quality.

Overall, embodiments of the disclosure provide a comprehensive solution to mitigate the impact of heat on camera sensors in electronic devices with integrated mm Wave communication capabilities. By intelligently managing heat transfer and implementing thermal mitigation strategies, embodiments of the disclosure ensure optimal performance and quality of visual data captured by these devices, enhancing the overall user experience. Other advantages will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, laptop computers, desktop computers, servers, networked computers, multimedia players, and so forth. Still other types of electronic devices can be configured in accordance with one or more embodiments of the disclosure as will be readily appreciated by those of ordinary skill in the art having the benefit of this disclosure.

The electronic device 100 includes a device housing 101. In one or more embodiments the device housing 101 is manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single device housing 101. However, in other embodiments two or more device housings can be included.

Illustrating by example, in other embodiments an electronic device includes a first device housing and a second device housing. In one or more embodiments, a hinge assembly couples the first device housing to the second device housing. In one or more embodiments, the first device housing is selectively pivotable about the hinge assembly relative to the second device housing. For example, in one or more embodiments the first device housing is selectively pivotable about the hinge assembly between a closed position and an axially displaced open position. In still other embodiments, multiple hinges can be incorporated into the electronic device to allow it to be folded in multiple locations.

This illustrative electronic device 100 of FIG. 1 includes a display 102. The display 102 can optionally be touch-sensitive. In one embodiment where the display 102 is touch-sensitive, the display 102 can serve as a primary user interface of the electronic device 100. Users can deliver user input to the display 102 of such an embodiment by delivering touch input from a finger, stylus, or other objects disposed proximately with the display 102.

In one embodiment, the display 102 is configured as an organic light emitting diode (OLED) display fabricated on a substrate. Where the electronic device is flexible, the substrate can comprise flexible plastic substrate, thereby making the display 102 a flexible display or foldable display that deforms when the first device housing pivots about the hinge assembly relative to the second device housing.

Features can be incorporated into the device housing 101. Examples of such features include an image capture device 103 or an optional speaker port. A user interface component, which may be a button or touch sensitive surface, can also be disposed along the device housing 101. Other features can be added as well.

A block diagram schematic 104 of the electronic device 100 is also shown in FIG. 1. The block diagram schematic 104 can be configured as a printed circuit board assembly disposed within the device housing 101 of the electronic device 100. Various components can be electrically coupled together by conductors, or a bus disposed along one or more printed circuit boards.

It should be noted that the block diagram schematic 104 includes many components that are optional, but which are included in an effort to demonstrate how varied electronic devices configured in accordance with embodiments of the disclosure can be. Thus, it is to be understood that the block diagram schematic 104 of FIG. 1 is provided for illustrative purposes only and for illustrating components of one electronic device 100 in accordance with embodiments of the disclosure.

The block diagram schematic 104 of FIG. 1 is not intended to be a complete schematic diagram of the various components required for an electronic device 100. Therefore, other electronic devices in accordance with embodiments of the disclosure may include various other components not shown in FIG. 1 or may include a combination of two or more components or a division of a particular component into two or more separate components, and still be within the scope of the present disclosure.

In one or more embodiments, the electronic device 100 includes one or more processors 105. The one or more processors 105 can be a microprocessor, a group of processing components, one or more Application Specific Integrated Circuits (ASICs), programmable logic, or other type of processing device. The one or more processors 105 can be operable with the various components of the electronic device 100. The one or more processors 105 can be configured to process and execute executable software code to perform the various functions of the electronic device 100. A storage device, such as memory 106, can optionally store the executable software code used by the one or more processors 105 during operation.

In one or more embodiments, the one or more processors 105 are further responsible for performing the primary functions of the electronic device 100. For example, in one embodiment the one or more processors 105 comprise one or more circuits operable to present presentation information, such as images, text, and video, on the display 102. The executable software code used by the one or more processors 105 can be configured as one or more modules 107 that are operable with the one or more processors 105. Such modules 107 can store instructions, control algorithms, and so forth.

In one embodiment, the one or more processors 105 are responsible for running the operating system environment 108. The operating system environment 108 can include a kernel, one or more drivers 109, and an application service layer 110, and an application layer 111. The operating system environment 108 can be configured as executable code operating on one or more processors or control circuits of the electronic device 100.

In one or more embodiments, the one or more processors 105 are responsible for managing the applications of the electronic device 100. In one or more embodiments, the one or more processors 105 are also responsible for launching, monitoring, and killing the various applications and the various application service modules. The applications of the application layer 111 can be configured as clients of the application service layer 110 to communicate with services through application program interfaces (APIs), messages, events, or other inter-process communication interfaces.

In this illustrative embodiment, the electronic device 100 also includes a communication device 112 that can be configured for wired or wireless communication with one or more other devices or networks. The networks can include a wide area network, a local area network, and/or personal area network. The communication device 112 may also utilize wireless technology for communication, such as, but are not limited to, peer-to-peer or ad hoc communications, and other forms of wireless communication such as infrared technology. The communication device 112 can include wireless communication circuitry, one of a receiver, a transmitter, or transceiver, and one or more antennas 113.

The one or more antennas 113 can take a variety of forms. Illustrating by example, in one or more embodiments using 5G communication as an example, the one or more antennas 113 can comprise a MIMO antenna array 114 comprising a plurality of wireless communication subsystems 115,116, 117,118 configured for MIMO communication 124 with other remote electronic devices, servers, base stations 122, and so forth, across a network 131. In other embodiments, each of the wireless communication subsystems 115,116, 117,118 can comprise mm Wave wireless communication subsystems.

In one or more embodiments, a MIMO antenna array 114 consists of four wireless communication subsystems 115, 116,117,118. While four wireless communication subsystems 115,116,117,118 can define a MIMO antenna array 114 or a mmWave system in some embodiments, additional wireless communication subsystems are shown in FIG. 1 to illustrate the various locations 129,130 at which such wireless communication subsystems may be located. It should be noted that embodiments of the disclosure the electronic device 100 can be equipped with six antenna element, eight antenna element, or higher numbers of antenna elements, located at different locations as well. Other configurations will be obvious to those of ordinary skill in the art having the benefit of this disclosure.

In one or more embodiments, the one or more antennas 113 also include multiple mm Wave antenna assemblies 120. In one or more embodiments, each mmWave antenna assembly 120 comprises an array of mm Wave antenna elements. In other embodiments, each mmWave antenna assembly 120 comprises a single mmWave antenna element. Other examples of mm Wave antenna assemblies configured in accordance with embodiments of the disclosure will be obvious to those of ordinary skill in the art having the benefit of this disclosure.

In one or more embodiments, at least one wireless communication subsystem, e.g. wireless communication subsystem 118 will be farther from an image capture device 103 than another wireless communication subsystem, e.g., wireless communication subsystem 115. Said differently, in one or more embodiments the electronic device 100 comprises at least a first wireless communication subsystem 115 that is situated closer to the at least one image capture device 103 than a second wireless communication subsystem 118. This allows the one or more processors 105 to, when a temperature of the at least one image capture device 103 exceeds a predefined threshold, transfer at least some electronic communication operations of the electronic device 100 being performed by the first wireless communication subsystem 115 to the second wireless communication subsystem 118. In one or more embodiments, both the first wireless communication subsystem 115 and the second wireless communication subsystem 118 comprise mm Wave wireless communication subsystems.

In the illustrative embodiment of FIG. 1, the image capture device 103 and the first wireless communication subsystem 115 are situated at an end of the device housing 101. However, the second wireless communication subsystem 118 is situated at the other end of the device housing 101. In other embodiments, the image capture device 103 and the first wireless communication subsystem 115 are situated at an end of the device housing 101, while the second wireless communication subsystem 119 is centrally located within the device housing 101.

The one or more processors 105 can be configured to detect the temperature of the at least one image capture device 103 in a variety of ways. Illustrating by example, in one or more embodiments the one or more sensors 125 comprise a temperature sensor that is proximately located with the at least one image capture device 103. However, in other embodiments proxies can be used to determine the temperature of the at least one image capture device 103. Illustrating by example, in other embodiments the one or more processors 105 are configured to detect the temperature of the at least one image capture device 103 by detecting the image capture device boosting one or both of gain and/or ISO while performing image capture operations. Embodiments of the disclosure contemplate that this can occur when dark shot noise is causing noise in the image capture device sensor. Accordingly, in one or more embodiments the one or more processors 105 are configured to detect the temperature of the at least one image capture device 103 exceeding a predefined threshold by detecting the image capture device 103 boosting one or both of gain and/or ISO while performing the image capture operations. This works because in many instances the temperature of the at least one image capture device 103 will exceed the predefined threshold causes dark shot noise to appear in one or more images captured by the at least one image capture device.

In the illustrative embodiment of FIG. 1, the at least one image capture device 103 and a first wireless communication subsystem are proximately located within the electronic device 100. In this illustrative embodiment, wireless communication subsystems 115,116,121 are proximately located at a first end 128 of the electronic device 100, with wireless communication subsystem 121 and the at least one image capture device 103 being adjacent. As previously explained, when these wireless communication subsystems 115,116, 121 are mm Wave antenna assemblies, they operate at high frequencies and can generate a lot of heat, especially when operating at high power. Accordingly, they can warm the sensor of the at least one image capture device 103, which gives rise to the dark shot noise problem.

Advantageously, embodiments of the disclosure provide a method that can be performed by the one or more processors 105 to reduce an operating temperature of a first wireless communication subsystem, e.g., wireless communication subsystem 115, which is situated closer to the at least one image capture device 103 by transferring at least some communication operations to a second wireless communication subsystem, e.g., wireless communication subsystem 118, which is situated farther from the at least one image capture device 103 to improve the dark shot noise performance of the at least one image capture device 103 while the at least one image capture device 103 is capturing one or more images. In one or more embodiments, the at least some communication operations comprise mm Wave communication operations. In one or more embodiments, electronic communication operations other than the mm Wave communications performed by other wireless communication subsystems continue while the at least one image capture device 103 is capturing the one or more images.

In one or more embodiments, a condition detection manager 126 can then re-check the at least one image capture device 103 to see if any dark shot noise previously detected has been mitigated. Where it has not, in one or more embodiments the one or more processors 105 case at least some electronic communication operations after transferring the communication operations to further improve the dark shot noise performance of the at least one image capture device 103 while the at least one image capture device 103 is capturing the one or more images.

One or both of the mm Wave antenna assembly driver 123 and/or the condition detection manager 126 can be configured as a hardware module operable with the one or more processors 105 in one or more embodiments. In other embodiments, these components are configured as software or firmware operating on the one or more processors 105. In still other embodiments, these components are configured as a hardware component integrated within the one or more processors 105. Other configurations for these components will be obvious to those of ordinary skill in the art having the benefit of this disclosure.

As noted above, one or more sensors 125 can be included to elevated temperatures within the electronic device 100. The one or more sensors 125 can include sensors other than temperature sensors as well.

Illustrating by example, in one or more embodiments these one or more sensors 125 can include one or more proximity sensors that detect objects approaching, or becoming proximately located with, surfaces of the electronic device 100. As noted above, the one or more sensors 125 can include at least one image capture device 103.

In one or more embodiments, the at least one image capture device 103 is configured as an intelligent imager. Where configured as an intelligent imager, the at least one image capture device 103 can capture one or more images of environments about the electronic device 100 to determine whether the object matches predetermined criteria. For example, the at least one image capture device 103 can operate as an identification module configured with optical recognition such as image recognition, character recognition, visual recognition, facial recognition, color recognition, shape recognition and the like.

Where the electronic device includes a first device housing that is pivotable about a hinge relative to a second device housing, the one or more sensors 125 can include one or more form factor sensors configured to detect changes in a physical form factor of the electronic device. Illustrating by example, in one embodiment, the one or more form factor sensors comprise one or more flex sensors, operable with the one or more processors 105, to detect a bending operation that causes the first device housing to pivot about the hinge assembly relative to the second device housing, thereby transforming the electronic device into a deformed geometry. In one or more embodiments, the one or more flex sensors can detect initiation of the first device housing pivoting, bending, or deforming about the hinge assembly relative to the second device housing.

In one or more embodiments, the one or more sensors 125 comprise an inertial motion unit. The one or more processors 105 can compare motion sensor readings from the inertial motion unit to detect movement of the electronic device in three-dimensional space. Each inertial motion unit can comprise a combination of one or more accelerometers, one or more gyroscopes, and optionally one or more magnetometers, to determine the orientation, angular velocity, and/or specific force of the electronic device 100. When included in the electronic device 100, these inertial motion units can be used as orientation sensors to measure movement of the device housing 101 in three-dimensional space. Similarly, the inertial motion units can be used as orientation sensors to measure the motion of the device housing 101 in three-dimensional space. The inertial motion units can be used to make other measurements as well.

Thus, the one or more sensors 125 can include one or more of an accelerometer, gyroscope, and/or inertial motion to determine an orientation of the electronic device 100 in three-dimensional space. This orientation determination can include measurements of azimuth, plumb, tilt, velocity, angular velocity, acceleration, and angular acceleration, of the device housing 101, or where the electronic device is configured as a bendable electronic device, one of the first device housing or the second device housing. When the electronic device is bendable, and when two inertial motion units are included, with one inertial motion unit being situated in the first device housing and another inertial motion unit being situated in the second device housing, each inertial motion unit can determine motion of its respective device housing is occurring. In one or more embodiments, each inertial motion unit delivers these orientation measurements to the one or more processors 105 in the form of orientation determination signals.

Other components 127 of the electronic device 100 may include a microphone, an earpiece speaker, a loudspeaker, key selection sensors, a touch pad sensor, a touch screen sensor, a capacitive touch sensor, and one or more switches. Touch sensors may be used to indicate whether any of the user actuation targets present on the display are being actuated. Alternatively, touch sensors disposed along the device housing 101 can be used to determine whether the electronic device 100 is being touched at side edges or major faces of the electronic device 100 by a surface, hands, keys, or other objects. The touch sensors can include surface and/or housing capacitive sensors in one embodiment.

In one or more embodiments, the other components 127 include a gravity detector. For example, as one or more accelerometers and/or gyroscopes may be used to show vertical orientation, constant, or a measurement of tilt relative to gravity. The other components 127 operable with the one or more processors 105 can include output components such as video outputs, audio outputs, and/or mechanical outputs. Examples of output components include audio outputs, an earpiece speaker, haptic devices, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 2:
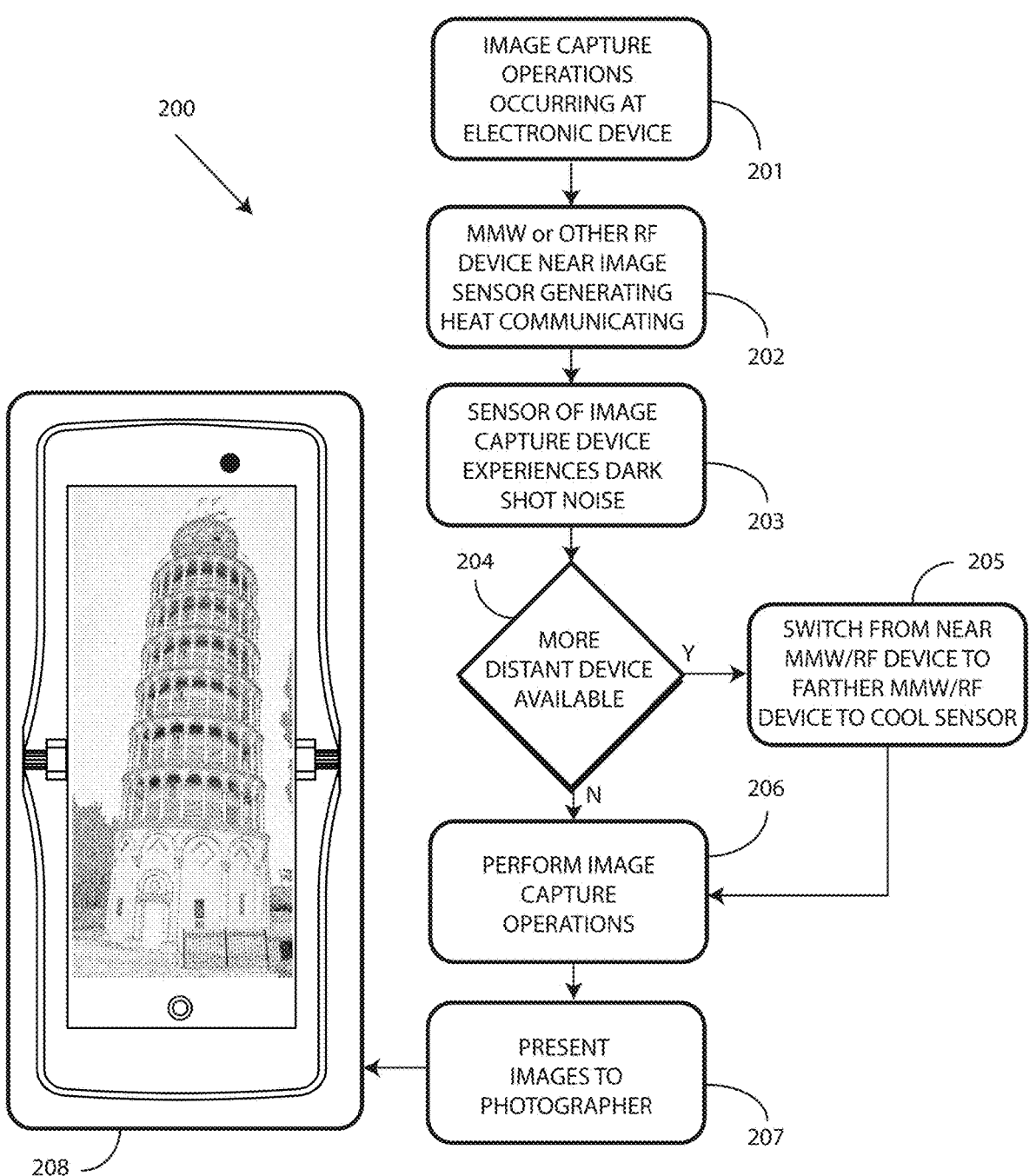
FIG. 2 illustrates one explanatory method in accordance with one or more embodiments of the disclosure.

Turning now to FIG. 2, illustrated therein is one explanatory method in accordance with one or more embodiments of the disclosure. The method, denoted as 200, includes several steps and decisions. In one or more embodiments, the method 200 comprises detecting, by one or more processors of an electronic device, an elevated thermal energy event occurring at an image capture device that compromises performance of image capture operations by the image capture device, which can occur at step 203. The method 200 then determines, such as at decision 204 using the one or more processors, whether a second wireless communication subsystem situated farther from the image capture device is available. If so, in one or more embodiments the method 200 transfers electronic communication operations from the first wireless communication subsystem to the second wireless communication subsystem to mitigate the dark shot noise and reduce the temperature of the image capture device.

The method 200 begins at step 201, which detects image capture operations occurring at the electronic device. This can occur, for example, when a user touches a user actuation target presented on a display to launch a camera application to start taking pictures.

Step 202 then determines whether a first wireless communication subsystem is situated proximately with the image capture device performing the image capture operations at step 201 is communicating with a remote electronic device or system and is generating heat. Step 203 then comprises detecting, by one or more processors of the electronic device, an elevated thermal energy event occurring at the image capture device that compromises performance of image capture operations at the image capture device. In one or more embodiments, step 203 comprises determining whether the image capture device is experiencing a dark shot noise problem.

Step 203 can occur in a variety of ways. In one or more embodiments, step 203 comprises detecting, by the one or more processors from the image capture device, the image capture device boosting an ISO setting while performing the image capture operations initiated at step 201. In other embodiments, step 203 comprises the one or more processors of the electronic device detecting a temperature of the image capture device exceeding a predefined threshold using a temperature sensor. In one or more embodiments, the predefined threshold is the maximum temperature rating of the manufacturer of the image capture device. Other examples of predefined thresholds will be obvious to those of ordinary skill in the art having the benefit of this disclosure.

Decision 204 then determines if there is another wireless communication subsystem, situated farther from the image capture device, that is capable of performing the electronic communication operations currently being handled by the wireless communication subsystem causing the image capture device to be warm. In one or more embodiments, this decision 204 takes into account multiple considerations.

In one or more embodiments, decision 204 comprises determining whether a second wireless communication subsystem is (1) situated farther from the image capture device than a first wireless communication subsystem currently performing communication operations, (2) is in an inactive state when the elevated thermal energy event of the image capture device is detected as compromising performance at steps 202,203, and (3), has a lower temperature than the first wireless communication subsystem.

In one or more embodiments, if one or more of these considerations is negative, the method performs image capture operations at step 206. Step 206 can optionally comprise disabling, by the one or more processors, all electronic communication operations of all wireless communication subsystems of the electronic device when the second wireless communication subsystem has a higher temperature than the first wireless communication subsystem. This optional operation can be performed to allow the image capture device to cool prior to capturing the images during the image capture operations.

However, where all three are true, in one or more embodiments step 205 comprises transferring, by the one or more processors in response to steps 202,203, electronic communication operations being performed by a first wireless communication subsystem situated closer to the image capture device to cause the second wireless communication subsystem situated farther from the image capture device to perform the electronic communication operations when the second wireless communication subsystem has a lower temperature than the first wireless communication subsystem. In one or more embodiments, the transferring of step 205 occurs only when a temperature sensor detects the temperature of the first wireless communication subsystem exceeding a predefined threshold at step 202.

Step 205 can take other actions as well. Illustrating by example, one or more embodiments step 205 comprises determining, by one or more processors from a temperature sensor, whether the temperature of the first wireless communication subsystem has fallen below the predefined threshold of the image capture device detected at step 203 after the transfer of communication operations has occurred. Where it has not, i.e., when the temperature of the first wireless communication subsystem fails to fall below the predefined threshold after the communication operations are transferred, in one or more embodiments step 205 comprise disabling the electronic communication operations the first wireless communication subsystem was performing while the image capture device is performing the image capture device operations at step 206. Thereafter, the electronic communication operations can be restarted.

In other embodiments where the temperature of the first wireless communication subsystem fails to fall below the predefined threshold after the communication operations are transferred, step 205 can comprise disabling all communication operations of all wireless communication subsystems of the electronic device while the image capture device is performing the image capture device operations at step 206. Thereafter, the electronic communication operations can be restarted.

Embodiments of the disclosure contemplate that a user may not want the electronic communication operations of the electronic device to be compromised when taking pictures. Accordingly, in one or more embodiments step 205 comprises measuring, using one or more processors of the electronic device from the first wireless communication subsystem prior to transfer, a signal quality of the electronic communication operations being performed by the first wireless communication subsystem. In one or more embodiments, the transfer at step 205 only occurs when another signal quality of the electronic communication operations when performed by the second wireless communication subsystem is within a predefined range of the signal quality of the first wireless communication subsystem. This predefined range can vary based upon design or application. For instance, in one or more embodiments the predefined range comprises plus or minus ten percent from the original signal quality, in another embodiment within five percent from the original signal quality, in another embodiment within one percent from the original signal quality, and in another embodiment within one-half percent from the original signal quality. Other predefined ranges will be obvious to those of ordinary skill in the art having the benefit of this disclosure.

Where step 205 comprises measuring this predefined range, in one or more embodiments when the other signal quality of the electronic communications when performed by the second wireless communication subsystem is outside the predefined range of the signal quality, step 205 can comprise reducing, by the one or more processors, a temperature of the first wireless communication subsystem by reducing operational capabilities of the first wireless communication subsystem.

The image capture operations can then be performed at step 206. In one or more embodiments, step 206 comprises the image capture device capturing one or more images, which are presented to the photographer at step 207. As shown at step 208, this results in crystal clear images that do not suffer the dark shot noise problem described above with reference to FIG. 6.

Step 207 can perform other operations as well. Illustrating by example, in one or more embodiments since the image capture operations are now complete, step 207 can comprise again transferring, by the one or more processors in response to the cessation of the performance of the image capture operations, the electronic communication operations being performed by the second wireless communication subsystem back to cause the first wireless communication subsystem to again perform the communication operations. In effect, this "undoes" the transferring actions when the image capture operations are complete.

Thus, as shown and described in FIG. 2, in one or more embodiments a method 200 provides a mechanism designed to enhance the dark noise performance of a camera sensor when it becomes hot. In one or more embodiments, this is achieved by addressing the temperature of nearby mm Wave modules actively engaged in communication. These mmWave modules, if left unchecked, can transfer heat to the camera sensor while it is performing image capture operations.

In one or more embodiments, to prevent this the method 200 switches communication operations to an alternative mm Wave module that is positioned at a greater distance from the camera sensor, provided it satisfies certain signal quality and thermal conditions. Illustrating by example, in one or more embodiments the transfer occurs where the alternate mm Wave module is situated farther from the image capture device than a first wireless communication subsystem, is in an inactive state when the elevated thermal energy event occurring at the image capture device is detected and has a lower temperature than the first wireless communication subsystem.

In one or more embodiments, if no suitable alternate mm Wave module is available, the method 200 attempts to thermally mitigate the primary mm Wave module to reduce its temperature. Should the camera sensor remain hot despite these efforts, the method 200 can even the step of disabling the mm Wave communication while the image capture operations are being performed. In extreme cases, if the camera sensor's temperature does not decrease, the device may even release the radio resource control connection to cool down the sensor. In one or more embodiments, once the camera module's temperature normalizes, these actions are reversed to resume normal operations.

Additional advantages of transferring electronic communication operations to manage the temperature of an image capture device include improved image quality due to reduced thermal noise, extended sensor lifespan by avoiding overheating, and potential energy savings from more efficient thermal management. This proactive approach to temperature control can also lead to a more stable and reliable device performance, as well as a better user experience due to uninterrupted camera operation.

Advantageously, embodiments of the disclosure provide novel electronic devices and corresponding methods that, when a user starts an image capture application with a high sensitivity setting (high ISO) when the camera is overheated, and a nearby mm Wave module is also hot, switching to a different mm Wave module that is further away if possible. Otherwise, embodiments of the disclosure will attempt to cool down the first mm Wave module using the current cooling methods. If these steps do not lower the camera's temperature, the system may turn off the mm Wave or stop the radio resource control connection. Once the camera cools down, these actions are reversed.

Please note that the specific details and order of the steps of FIG. 2 may vary depending on the implementation and requirements of the electronic device. The method 200 described in FIG. 2 provides an overview of the process for transferring electronic communication operations between wireless communication subsystems to mitigate dark noise in the image capture device. Other variations of the method 200 of FIG. 2 will be obvious to those of ordinary skill in the art having the benefit of this disclosure.

Figure 3:
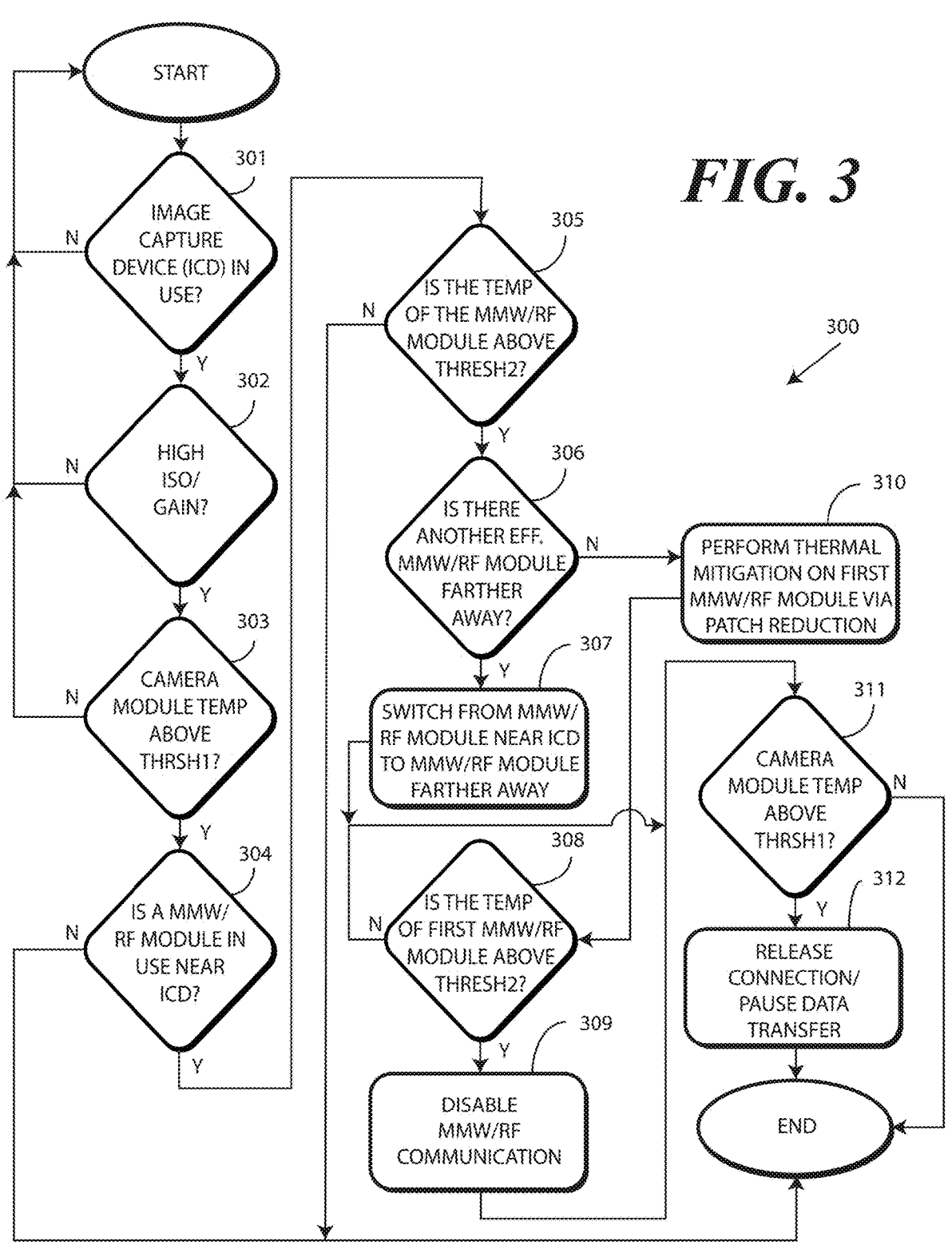
FIG. 3 illustrates another explanatory method in accordance with one or more embodiments of the disclosure.

Turning now to FIG. 3, illustrated therein is another explanatory method 300 in accordance with one or more embodiments of the disclosure. The method, denoted as 300, includes several decisions and steps.

At decision 301, the method determines whether a camera application has been launched by a user, thereby requesting an image capture device to perform one or more image capture operations. If no such image capture operations have been requested, in one or more embodiments the method 300 ends.

If image capture operations have been requested, e.g., if the camera application is launched or in use, the method 300 proceeds to decision 302. At decision 302, the method 300 determines whether the image sensor of the camera is operating at a high ISO or gain. This condition is important because high ISO settings or sensor gain can lead to an increase in noise levels in the captured images and, in particular, the occurrence of dark shot noise problems. When the ISO or gain is set to a high level, the image sensor becomes more sensitive to light, which can amplify both the desired signal and the unwanted noise.

Decision 302 can occur in a variety of ways. Illustrating by example, the condition of operating at a high ISO or gain may be true in situations where the user of the electronic device wants to capture images in low-light conditions or when they want to emphasize details in the image. In such scenarios, increasing the ISO or gain can help to brighten the image and improve visibility.

To detect whether the camera is operating at a high ISO or gain, decision 302 can utilize information from the camera settings or metadata associated with the captured images. The camera application or the image processing software can provide access to the ISO or gain value used during image capture. By comparing this value to a predefined threshold for high ISO or gain, decision 302 can determine whether the condition is met.

Additionally, decision 302 may also consider other factors such as the lighting conditions, exposure settings, or user preferences to further validate the high ISO or gain condition. For example, if the captured images exhibit characteristics of high noise levels or if the user explicitly sets the ISO or gain to a high value, it can provide additional evidence for the condition. By detecting whether the camera is operating at a high ISO or gain, decision 302 can effectively identify situations where the image sensor is more susceptible to noise, thereby allowing the method 300 to take appropriate actions to mitigate the impact of dark shot noise on the captured images.

At decision 303, the method 300 determines whether the temperature of the image sensor of the camera is above a predefined threshold. This condition is important because elevated temperatures can adversely affect the performance and image quality of the camera sensor. When the temperature exceeds the threshold, it indicates that the image sensor is experiencing excessive heat, which can lead to increased dark shot noise and other undesirable effects in the captured images.

There are several ways decision 303 can detect whether the temperature of the image sensor is above the predefined threshold. One approach is to utilize temperature sensors or thermal sensors that are integrated into the camera module or the electronic device itself. These sensors can measure the temperature directly and provide real-time feedback to the method. By comparing the measured temperature with the predefined threshold, decision 303 can determine whether the condition is met.

Another approach is to analyze the thermal characteristics of the camera module and the surrounding components. Decision 303 can monitor the heat dissipation and temperature distribution within the device using thermal imaging techniques or by analyzing the temperature profiles of different components. By assessing the thermal behavior, decision 303 can infer the temperature of the image sensor and determine whether it exceeds the predefined threshold.

Additionally, decision 303 can also consider indirect indicators of temperature, such as the operating conditions of other heat-generating components in the device. For example, if the mmWave modules or other RF components are operating at high power levels or generating excessive heat, it can be an indication that the temperature of the image sensor might also be elevated. By monitoring the behavior of these components, the method can make an informed decision regarding the temperature condition of the image sensor.

By detecting whether the temperature of the image sensor is above the predefined threshold at decision 303, the method 300 can take appropriate actions to mitigate the thermal effects and prevent degradation in image quality. These actions may include transferring electronic communication operations to a cooler wireless communication subsystem, applying thermal mitigation techniques, or even temporarily disabling certain modules to allow the image sensor to cool down.

At decision 304 of FIG. 3, the method 300 determines whether a mm Wave module is operating near the image sensor of the camera. This condition is important because the proximity of the mm Wave module to the camera can contribute to increased heat transfer and potentially impact the performance of the camera module. By detecting whether the mmWave module is in use near the camera at decision 304, the method 300 can assess the potential thermal effects on the camera and make informed decisions to mitigate any adverse impacts.

There are several ways to detect whether a mmWave module is operating near the camera at decision 304. One approach is to utilize information from the device's hardware or firmware. The electronic device can have sensors or monitoring mechanisms that can detect the activation or usage of the mm Wave module. This information can be obtained from the device's logs or system status, allowing the method to determine whether the mm Wave module is currently in use near the camera.

Another approach is to analyze the communication signals and frequencies being used by the mm Wave module. The method can monitor the wireless communication channels and identify whether the mmWave module is transmitting or receiving signals in close proximity to the camera module. By analyzing the frequency bands and signal characteristics, decision 304 can determine if the mm Wave module is operating near the camera.

Additionally, decision 304 can also consider the physical location and arrangement of the mm Wave module and the camera module within the electronic device. By analyzing the device's design and layout, the method can determine the proximity of the mm Wave module to the camera module. This can be determined based on the physical distance between the modules or their relative positions within the device's housing.

At decision 305 of FIG. 3, the method 300 determines whether the mm Wave module proximately located with the image sensor is operating above a predefined temperature threshold. This condition is important as the temperature of the mm Wave module can directly impact the temperature of the image sensor. By detecting whether the mm Wave module exceeds the predefined temperature threshold at decision 305, the method 300 can assess the potential thermal effects on the image sensor and make informed decisions to mitigate any adverse impacts. This temperature threshold serves as a reference point to determine if the mm Wave module is operating at a level that may contribute to increased heat transfer and potential degradation in the performance of the image sensor.

At decision 306 of FIG. 3, the method 300 looks to see if another effective mmWave module is located farther away from the image sensor of the camera than the first mm Wave module. In one or more embodiments another mm Wave module will be "effective" for transfer when it is situated farther from the image capture device than the first mm Wave module, is in an inactive state when the elevated thermal energy event occurs at the image capture device, meets predefined minimum signal quality criteria, and has a lower temperature than the first mm Wave module. This condition is important as it allows the method to assess the feasibility of switching to a different mm Wave module that is situated at a greater distance from the camera. Where such a mm Wave module is available, the method 300 moves to step 307. Otherwise, the method 300 moves to step 310 where thermal mitigation techniques are performed.

At step 307, the method 300 transfers, by the one or more processors in response to the previous decisions, electronic communication operations being performed by the mm Wave module situated proximately with the image sensor of the camera to cause the other mm Wave module found by decision 306 situated farther from the image capture device. If thermal mitigation techniques are required, in one or more embodiments step 310 comprises performing a patch reduction technique in an attempt to cool the mmWave module. This step 310 aims to lower the temperature of the mm Wave module to mitigate the thermal effects on the image sensor. One technique that can be employed for thermal mitigation is patch reduction.

Patch reduction involves reducing the number or size of antenna patches in the mm Wave module. By reducing the patch elements, the overall power dissipation and heat generation of the module can be decreased. This reduction in heat generation helps to lower the temperature of the mm Wave module, thereby reducing the potential impact on the image sensor.

The process of patch reduction can be implemented by adjusting the operation of the patches of the mmWave module. This may involve modifying how many patches of the antenna array are communicating or by optimizing the power distribution across patch elements within the module. By strategically reducing the patch elements performing communication operations, the thermal energy generated by the mm Wave module can be minimized, leading to a decrease in temperature.

Lowering the temperature of the mm Wave module through patch reduction is beneficial as it helps to mitigate the transfer of heat to the image sensor. By reducing the thermal impact on the image sensor, step 310 aims to improve the overall performance and image quality of the camera module. This thermal mitigation technique provides an effective means of managing the temperature of the mmWave module and ensuring optimal operation of the camera system.

Regardless of whether thermal mitigation is required, decision 308 determines if the temperature of the first mm Wave module remains above a second threshold. Where it is, step 309 then disables the communication operations of the mm Wave module proximately located with the image sensor of the camera.

Where it is not, or alternatively after the communication operations of the mm Wave module proximately located with the image sensor is disabled, decision 311 of FIG. 3 checks the temperature of the image sensor of the camera after the transfer to see if it has cooled below a threshold that avoids dark shot noise. This decision 311 ensures that the temperature of the image sensor has sufficiently decreased to mitigate the occurrence of dark shot noise. As noted above, dark shot noise is a type of image noise that arises from the thermal generation of electrons within the image sensor. By checking the temperature of the image sensor at decision 311, the method 300 can determine whether it has cooled down to a level that minimizes the impact of dark shot noise on the captured images.

To check the temperature of the image sensor at decision 311, the method 300 can utilize temperature sensors or thermal sensors integrated into the camera module or the electronic device. These sensors can measure the temperature directly and provide real-time feedback to the method. By comparing the measured temperature with the predefined threshold, the method can determine whether the temperature has cooled below the threshold.

The threshold for avoiding dark shot noise can be determined based on empirical data, calibration, or specifications provided by the camera sensor manufacturer. It represents the temperature level at which the image sensor operates optimally, minimizing the occurrence of dark shot noise and preserving image quality.

By checking the temperature of the image sensor after the transfer, the method ensures that the camera module is operating within the desired temperature range to avoid the detrimental effects of dark shot noise. This decision 311 helps to maintain the overall image quality and ensures that the captured images are free from excessive noise caused by thermal factors.

If the transfer of step 307 and any other operations performed by the method 300 have not cooled the image sensor of the camera, step 312 can comprise disabling all electronic communications. Thereafter, the image capture operations can continue. The method 300 can then be unwound. Said differently, in one or more embodiments the method 300 further comprises again transferring, by the one or more processors in response to cessation of the performance of the image capture operations, the electronic communication operations being performed by the distant mm Wave module back to cause the mm Wave module proximately located with the image sensor of the camera to perform the electronic communication operations.

Figure 4:
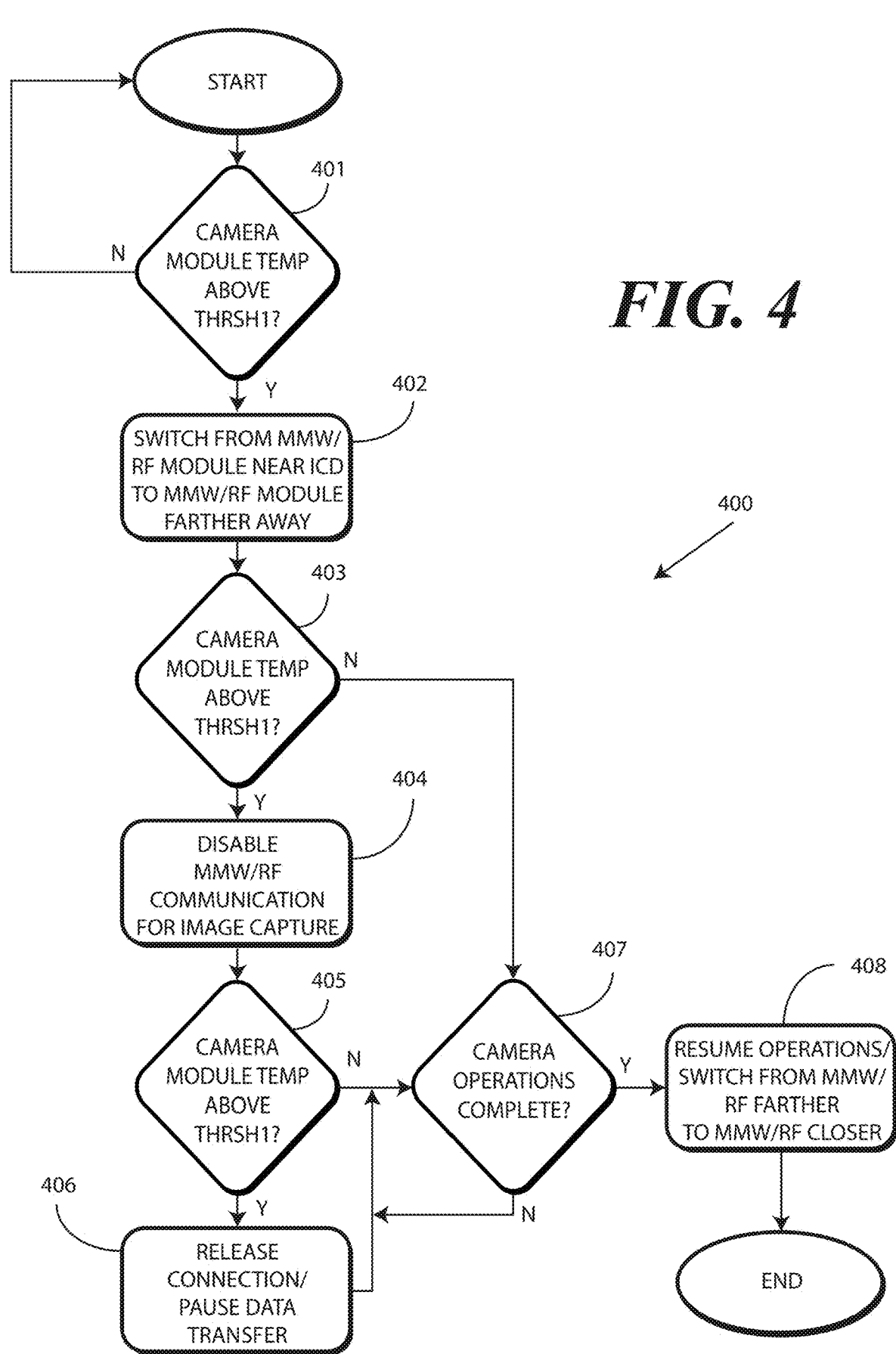
FIG. 4 illustrates still another explanatory method in accordance with one or more embodiments of the disclosure.

Turning now to FIG. 4, illustrated therein is a method 400 representing a sequence of operations executed by the electronic device to manage thermal energy events that may affect the performance of an image capture device. The method 400 begins with decision 401, where one or more processors of the electronic device detect an elevated thermal energy event at the image capture device. In one or more embodiments, decision 401 involves assessing whether the image capture device is experiencing conditions that compromise the image capture operations due to excessive heat.

Following decision 401, step 402 involves the one or more processors determining whether a second wireless communication subsystem is situated farther from the image capture device than a first wireless communication subsystem. This determination is important to ascertain the spatial relationship between the image capture device and the wireless communication subsystems, which may contribute to the thermal energy event.

In one or more embodiments, step 402 can also determine if the second wireless communication subsystem is in an inactive state when the elevated thermal energy event is detected at decision 401. Where included, this extra operation evaluates the operational status of the second wireless communication subsystem and assess the subsystem's potential to be used to reduce the elevated thermal energy event occurring at the image capture device.

Thereafter, step 402 transfers at least some electronic communication operations to the second wireless communication subsystem situated farther from the image capture device to improve dark noise performance of the image capture device while the image capture device is capturing one or more images. Decision 403 determines whether the temperature of the image sensor of the camera falls below a threshold precluding dark shot noise from affecting the quality of images captured by the image sensor. Where it has, image capture operations can occur, with decision 407 determining whether the image capture operations have ceased. Otherwise, thermal mitigation techniques can occur at step 404.

In one or more embodiments, step 404 comprises disabling, by the one or more processors, the electronic communication operations of the wireless communication subsystem situated proximately with the image capture device while the image capture device is performing the image capture operations. Other thermal mitigation techniques, such as the patch reduction system described above with reference to FIG. 3, can also be used. Still other thermal mitigation techniques will be obvious to those of ordinary skill in the art having the benefit of this disclosure.

Thereafter, the temperature of the camera can again be measured at step 405. If still further thermal mitigation techniques are required, step 406 can comprise disabling, by the one or more processors, all electronic communication operations of all wireless communication subsystems of the electronic device while the image capture device is performing the image capture operations.

Once the image capture operations are complete, as determined by decision 407, step 408 can comprise again transferring, by the one or more processors in response to cessation of the performance of the image capture operations, the electronic communication operations being performed by the second wireless communication subsystem back to cause the first wireless communication subsystem to perform the electronic communication operations.

Please note that the specific details and order of the steps may vary depending on the implementation and requirements of the electronic device. The method described in FIG. 4 provides an overview of the process for transferring electronic communication operations and applying thermal mitigation techniques to mitigate dark noise in the image capture device.

Figure 5:
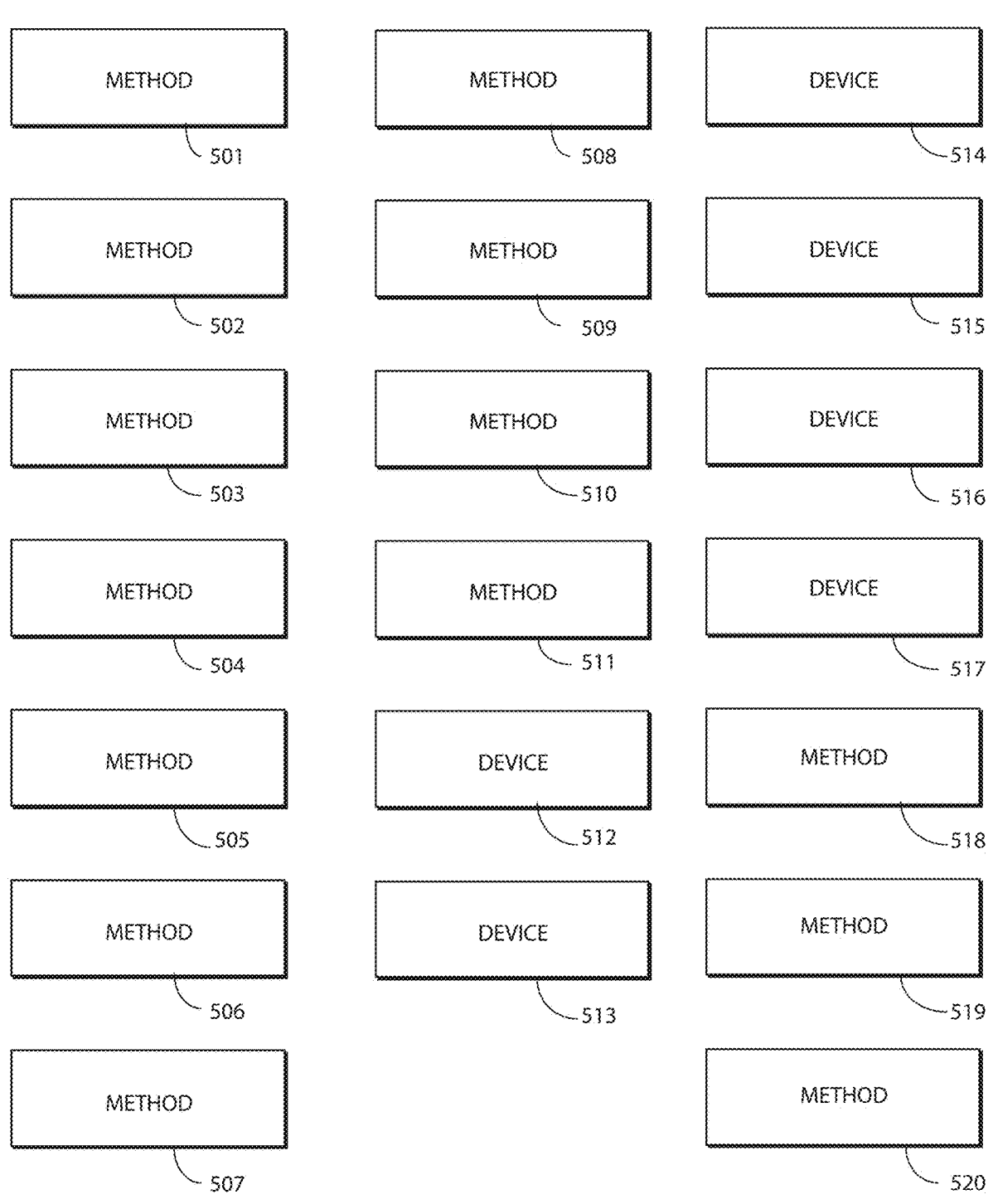
FIG. 5 illustrates various embodiments of the disclosure.

Turning now to FIG. 5, illustrated therein are various embodiments of the disclosure. The embodiments of FIG. 5 are shown as labeled boxes in FIG. 5 due to the fact that the individual components of these embodiments have been illustrated in detail in FIGS. 1-4, which precede FIG. 5. Accordingly, since these items have previously been illustrated and described, their repeated illustration is no longer essential for a proper understanding of these embodiments. Thus, the embodiments are shown as labeled boxes.

At 501, a method in an electronic device comprises detecting, by one or more processors of an electronic device, an elevated thermal energy event occurring at an image capture device that compromises performance of image capture operations by the image capture device. At 501, the method comprises determining, by the one or more processors, whether a second wireless communication subsystem is situated farther from the image capture device than a first wireless communication subsystem, is in an inactive state when the elevated thermal energy event occurring at the image capture device is detected and has a lower temperature than the first wireless communication subsystem.

At 501, the method comprises one of transferring, by the one or more processors in response to the detecting, electronic communication operations being performed by a first wireless communication subsystem situated closer to the image capture device to cause the second wireless communication subsystem situated farther from the image capture device to perform the electronic communication operations when the second wireless communication subsystem has a lower temperature than the first wireless communication subsystem, or disabling, by the one or more processors, all electronic communication operations of all wireless communication subsystems of the electronic device when the second wireless communication subsystem has a higher temperature than the first wireless communication subsystem.

At 502, the detecting of 501 comprises detecting, by the one or more processors from the image capture device, the image capture device boosting an ISO setting while performing the image capture operations. At 503, the detecting of 501 comprises detecting, by the one or more processors from a temperature sensor proximately located to the image capture device, that a temperature of the image capture device exceeds a predefined threshold.

At 504, the method of 503 further comprises determining, by the one or more processors from the temperature sensor, whether the temperature of the first wireless communication subsystem falls below the predefined threshold after the transferring. At 504, where the temperature of the first wireless communication subsystem fails to fall below the predefined threshold after the transferring, the method comprises disabling, by the one or more processors, the electronic communication operations while the image capture device is performing the image capture operations.

At 505, the method of 503 further comprises determining, by the one or more processors from the temperature sensor, whether the temperature of the first wireless communication subsystem falls below the predefined threshold after the transferring. Where the temperature of the first wireless communication subsystem fails to fall below the predefined threshold after the transferring, the method comprises disabling, by the one or more processors, all electronic communication operations of all wireless communication subsystems of the electronic device while the image capture device is performing the image capture operations.

At 506, the method of 501 further comprises determining, by the one or more processors from a temperature sensor proximately located with the first wireless communication subsystem, whether a temperature of the first wireless communication subsystem exceeds a predefined threshold. At 506, the transferring occurs only when the temperature of the wireless communication subsystem exceeds the predefined threshold.

At 507, the method of 501 further comprises measuring, by the one or more processors from the first wireless communication subsystem, a signal quality of the electronic communication operations prior to the transferring. At 507, the transferring occurs only when another signal quality of the electronic communication operations when performed by the second wireless communication subsystem is within a predefined range of the signal quality.

At 508, the method of 507 further comprises, when the another signal quality of the electronic communications when performed by the second wireless communication subsystem is outside the predefined range of the signal quality, reducing, by the one or more processors, a temperature of the first wireless communication subsystem by reducing operational capabilities of the first wireless communication subsystem. At 509, the method of 501 further comprises again transferring, by the one or more processors in response to cessation of the performance of the image capture operations, the electronic communication operations being performed by the second wireless communication subsystem back to cause the first wireless communication subsystem to perform the electronic communication operations.

At 510, the elevated thermal energy event of 501 occurring at the image capture device causes dark shot noise in images captured by the image capture device. At 511, the first wireless communication subsystem of 510 and the second wireless communication subsystem are both mmWave wireless communication subsystems and the electronic communication operations comprise mm Wave radio frequency electronic communications.

At 512, an electronic device comprises at least one image capture device. At 512, the electronic device comprises a first wireless communication subsystem and at least a second wireless communication subsystem. At 512, The first wireless communication subsystem is situated closer to the at least one image capture device than the second wireless communication subsystem.

At 512, the electronic device comprises one or more processors operable with the at least one image capture device, the first wireless communication subsystem and the second wireless communication subsystem. At 512, when the one or more processors detect a temperature of the at least one image capture device exceeding a predefined threshold, the one or more processors transfer at least some electronic communication operations of the electronic device being performed by the first wireless communication subsystem to the second wireless communication subsystem.

At 513, the first wireless communication subsystem of 512 and the second wireless communication subsystem are both mm Wave wireless communication subsystems. At 514, the electronic device of 513 further comprises a device housing. At 514, the image capture device and first wireless communication subsystem are situated at an end of the device housing and the second wireless communication subsystem is centrally located within the device housing.

At 515, the one or more processors of 513 are configured to detect the temperature of the at least one image capture device exceeding the predefined threshold by detecting the image capture device boosting one or both of gain and/or ISO while performing the image capture operations. At 516, when the temperature of the at least one image capture device of 513 exceeds the predefined threshold, this causes dark shot noise to appear in one or more images captured by the at least one image capture device. At 517, the at least one image capture device and the first wireless communication subsystem of 513 are proximately located within the electronic device.

At 518, a method in an electronic device comprises reducing, by one or more processors, an operating temperature of a first wireless communication subsystem situated closer to an image capture device by transferring at least some electronic communication operations to a second wireless communication subsystem situated farther from the image capture device to improve dark noise performance of the image capture device while the image capture device is capturing one or more images. At 519, the method of 518 further comprises ceasing, by the one or more processors, the at least some electronic communication operations after the transferring to further improve the dark noise performance of the image capture device while the image capture device is capturing the one or more images.

At 520, the at least some electronic communication operations of 519 comprise millimeter-wave (mm Wave) communication operations. At 520, electronic communications other than the mm Wave communications performed by other wireless communication subsystems continue while the image capture device is capturing the one or more images.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:

detecting, by one or more processors of an electronic device, an elevated thermal energy event occurring at an image capture device that compromises performance of image capture operations by the image capture device;

determining, by the one or more processors, whether a second wireless communication subsystem is:

situated farther from the image capture device than a first wireless communication subsystem;

is in an inactive state when the elevated thermal energy event occurring at the image capture device is detected; and has a lower temperature than the first wireless communication subsystem; and transferring, by the one or more processors in response to the detecting, electronic communication operations being performed by a first wireless communication subsystem situated closer to the image capture device to cause the second wireless communication subsystem situated farther from the image capture device to perform the electronic communication operations when the second wireless communication subsystem has the lower temperature than the first wireless communication subsystem; and disabling, by the one or more processors, all electronic communication operations of all wireless communication subsystems of the electronic device when the second wireless communication subsystem has a higher temperature than the first wireless communication subsystem.

2. The method of claim 1, wherein the detecting comprises detecting, by the one or more processors from the image capture device, the image capture device boosting an ISO setting while performing the image capture operations.

3. The method of claim 1, wherein the detecting comprises detecting, by the one or more processors from a temperature sensor proximately located to the image capture device, that a temperature of the image capture device exceeds a predefined threshold.

4. The method of claim 3, further comprising:

determining, by the one or more processors from the temperature sensor, whether the temperature of the first wireless communication subsystem falls below the predefined threshold after the transferring; and where the temperature of the first wireless communication subsystem fails to fall below the predefined threshold after the transferring, disabling, by the one or more processors, the electronic communication operations while the image capture device is performing the image capture operations.

5. The method of claim 3, further comprising:

determining, by the one or more processors from the temperature sensor, whether the temperature of the first wireless communication subsystem falls below the predefined threshold after the transferring; and where the temperature of the first wireless communication subsystem fails to fall below the predefined threshold after the transferring, disabling, by the one or more processors, all electronic communication operations of all wireless communication subsystems of the electronic device while the image capture device is performing the image capture operations.

6. The method of claim 1, further comprising:

determining, by the one or more processors from a temperature sensor proximately located with the first wireless communication subsystem, whether a temperature of the first wireless communication subsystem exceeds a predefined threshold;

wherein the transferring occurs only when the temperature of the first wireless communication subsystem exceeds the predefined threshold.

7. The method of claim 1, further comprising:

measuring, by the one or more processors from the first wireless communication subsystem, a signal quality of the electronic communication operations prior to the transferring;

wherein the transferring occurs only when another signal quality of the electronic communication operations when performed by the second wireless communication subsystem is within a predefined range of the signal quality.

8. The method of claim 7, further comprising, when the another signal quality of the electronic communication operations when performed by the second wireless communication subsystem is outside the predefined range of the signal quality, reducing, by the one or more processors, a temperature of the first wireless communication subsystem by reducing operational capabilities of the first wireless communication subsystem.

9. The method of claim 1, further comprising again transferring, by the one or more processors in response to cessation of performance of the image capture operations, the electronic communication operations being performed by the second wireless communication subsystem back to cause the first wireless communication subsystem to perform the electronic communication operations.

10. The method of claim 1, wherein the elevated thermal energy event occurring at the image capture device causes dark shot noise in images captured by the image capture device.

11. The method of claim 10, wherein the first wireless communication subsystem and the second wireless communication subsystem are both millimeter-wave (mmWave) wireless communication subsystems and the electronic communication operations comprise mmWave radio frequency electronic communications.

12. An electronic device, comprising:

at least one image capture device;

a first wireless communication subsystem and at least a second wireless communication subsystem, wherein the first wireless communication subsystem is situated closer to the at least one image capture device than the second wireless communication subsystem; and one or more processors operable with the at least one image capture device, the first wireless communication subsystem and the second wireless communication subsystem;

wherein when the one or more processors detect a temperature of the at least one image capture device exceeding a predefined threshold by detecting the at least one image capture device boosting gain while performing image capture operations, the one or more processors transfer at least some electronic communication operations of the electronic device being performed by the first wireless communication subsystem to the second wireless communication subsystem.

13. The electronic device of claim 12, wherein the first wireless communication subsystem and the second wireless communication subsystem are both millimeter-wave (mmWave) wireless communication subsystems.

14. The electronic device of claim 13, further comprising a device housing, wherein the image capture device and first wireless communication subsystem are situated at an end of the device housing and the second wireless communication subsystem is centrally located within the device housing.

15. The electronic device of claim 13, wherein the one or more processors are further configured to detect the temperature of the at least one image capture device exceeding the predefined threshold by detecting the image capture device boosting ISO while performing the image capture operations.

16. The electronic device of claim 13, wherein the temperature of the at least one image capture device exceeding the predefined threshold causes dark shot noise to appear in one or more images captured by the at least one image capture device.

17. The electronic device of claim 13, wherein the at least one image capture device and the first wireless communication subsystem are proximately located within the electronic device.

18. A method in an electronic device, the method comprising reducing, by one or more processors, an operating temperature of a first wireless communication subsystem situated closer to an image capture device by transferring at least some electronic communication operations to a second wireless communication subsystem situated farther from the image capture device to improve dark noise performance of the image capture device while the image capture device is capturing one or more images.

19. The method of claim 18, further comprising ceasing, by the one or more processors, electronic communication operations after the transferring to further improve the dark noise performance of the image capture device while the image capture device is capturing the one or more images.

20. The method of claim 19, wherein:

the at least some electronic communication operations comprise millimeter-wave (mmWave) communication operations; and electronic communications other than the mmWave communication operations performed by other wireless communication subsystems continue while the image capture device is capturing the one or more images.

* * * * *